United States Patent [15] 3,637,502
Matson et al. [45] Jan. 25, 1972

[54] METHOD FOR MANUFACTURING GEL

[72] Inventors: Howard J. Matson, Markham, Ill.; Ira T. Fritz, Atlanta, Ga.

[73] Assignee: Atlantic Richfield Company, New York, N.Y.

[22] Filed: July 11, 1969

[21] Appl. No.: 841,122

[52] U.S. Cl. ...................................252/59, 252/16, 252/49.5, 252/316, 252/358
[51] Int. Cl. ..........................................C10m 1/16
[58] Field of Search.....................252/16, 59, 49.5, 308, 316, 252/358, 67; 208/37

[56] References Cited

UNITED STATES PATENTS

| | | | |
|---|---|---|---|
| 2,614,065 | 10/1952 | Wanderer et al. | 208/35 |
| 2,775,561 | 12/1956 | Frohmader et al. | 252/59 X |
| 2,972,578 | 2/1961 | Roehler | 252/49.5 X |
| 3,078,237 | 2/1963 | Creech et al. | 252/358 |

OTHER PUBLICATIONS

Kirk-Othmer " Encyclopedia of Chemical Technol." Vol. 4 (2nd Ed.) (1964) pages 366– 367.

Primary Examiner—Daniel E. Wyman
Assistant Examiner—W. Cannon
Attorney—McLean, Morton and Boustead

[57] ABSTRACT

An improved method for manufacturing a foam inhibitor for soluble oils is described. The foam inhibitor is a gel of a mineral oil of lubricating viscosity, about 2 to 10 weight percent of a petroleum microcrystalline wax and about 1 to 10 weight percent of a polymer of ethylene having a molecular weight of about 1,000 to 12,000. A mixture of these components is heated at a temperature sufficient to provide a solution and the heated solution is shock cooled by adding particles of solid carbon dioxide in an amount sufficient to cool the mixture to a temperature below about 120° F. in a time sufficient to yield a gel having low particle size and a high degree of particle distribution of the ethylene polymer and the wax.

7 Claims, No Drawings

METHOD FOR MANUFACTURING GEL

This invention relates to an improved method of forming a foam inhibitor. In particular, this invention relates to an improved method for forming a gel of a mineral oil of lubricating viscosity, about 2 to 10 weight percent of a petroleum microcrystalline wax and about 1 to 10 weight percent of a polymer of ethylene having a molecular weight of about 1,000 to 12,000 wherein a means for cooling is provided so that the temperature drop at certain steps does not fall below a minimum value.

Metalworking oils, such as soluble or emulsifiable cutting oils, are frequently employed under conditions which include extreme agitation and high pressure application. The conditions cooperate to effect lubrication and cooling but disadvantageously produce foam. Foam can interfere with visual control of the operation being effected, can insulate the piece being worked from the cooling action which the lubricant otherwise exerts and can escape the immediate work area and result in unsatisfactory operating conditions. Accordingly, it is undesirable that foam, especially stable foam, be produced during metalworking operations.

As disclosed in U.S. Pat. No. 2,972,578, the addition of the gels with which the present invention is concerned to a soluble oil results in a composition characterized by the ability to resist formation of and to destroy foam occurring during use. As described in the mentioned patent the gels of the present invention have been prepared by adding the polymer and wax to the material which comprises the liquid organic medium together, or one at a time, treating in a manner that effects solution and then rapidly cooling or chilling the mixture to obtain the gel. Rapid chilling has been used in the production of gels of the most satisfactory characteristics. This necessity of rapid chilling has naturally presented certain difficulties with respect to adequate cooling. For instance, it has been found, that in attempting to produce a satisfactory gel in warm climates such as during summer months of peak ambient temperature, i.e., at least about 80° F., employment of ordinary cooling media such as ambient temperature water or air by indirect heat exchange fails to effect the required rapid cooling so that the most advantageous gel formation is not obtained. Consequently, a less effective foam suppressor is produced unless inconvenient and more expensive indirect cooling methods are relied upon such as refrigerating means, ice cooled water, ice packs, etc., to overcome this difficulty. The problem has become severe when it is desired to produce large quantities of the gel throughout the year without provision of special cooling means or when it is desired to produce the gel in field service operations where special cooling means are not readily available.

In U.S. Pat. No. 3,078,237, there is disclosed a method of producing the gels of the present invention without necessarily resorting to rapid cooling. In accordance with that method, the ethylene polymer and wax are added, together or one at a time, to the organic liquid which comprises the organic medium, and the mixture is at or is heated to a temperature sufficient to effect solution of the polymer and wax. The mixture is then cooled to a temperature below the cloud point of the mixture, preferably at least about 5° F. below the cloud point, and reheated to a temperature within the range of immediately above the cloud point of the mixture, e.g., at least about 1° F. above, to about 20° F. above the cloud point, preferably up to about 10° F. above the cloud point and not above about 170° F. to effect dissolution. The mixture is then permitted to cool to below about 120° F., usually to room temperature. Although this patent discloses that the cooling from above the cloud point to below about 120° F. need not be performed using external cooling means, it has been found that this method is also temperature-sensitive, particularly during prolonged periods of hot weather, i.e., when ambient temperature is about 80° F. or higher. The cooling problem occurs during the cooling period from above the cloud point to below about 120° F. This cooling period apparently affects the particle size or particle distribution in the total mix. It has been found that when the cooling period requires 6 or 8 hours, the mixture has little or no foam inhibitor activity. Best results can be obtained when the cooling period requires about 2 hours or less.

This invention produces suitable foam inhibitors of the type described above by providing in the total mix while in the molten state, particles of solid carbon dioxide. The carbon dioxide provides shock-chilling of the mixture, thereby reducing the temperature of the mix in a rapid manner to give the particle size and particle distribution required for foam inhibition. The process is especially effective when the molten mixture is cooled by indirect heat exchange with a fluid having a temperature of at least about 80° F. due to ambient temperatures being of this magnitude. The use of solid carbon dioxide as a cooling means is applicable to the methods disclosed and claimed in U.S. Pat. Nos. 2,972,578 and 3,078,237, and in spite of the fact that solid carbon dioxide is added to the gel-forming mixture the structure of the resulting gel is satisfactory for foam-inhibiting purposes. Thus even with direct heat exchange between the carbon dioxide and the molten mixture the desired gel structure was not adversely affected.

The invention thus provides for a method of producing a gel as herein before described by heating the mixture of said oil of lubricating viscosity, ethylene polymer and microcrystalline wax at a temperature sufficient to provide solution and shock cooling the mixture by adding particles of solid carbon dioxide to the mixture in an amount sufficient to cool the mixture to a temperature below about 120° F. in a time sufficient to yield a gel of low-particle size and a high degree of particle distribution of the ethylene polymer and the wax. The amount of solid carbon dioxide added preferably is sufficient to cool the mixture to below about 120° F. in about 2 or 3 hours or less. The solution can be also first cooled below the cloud point of the mixture, reheated to a temperature within the range of immediately above the cloud point of the mixture to about 20° F. above the cloud point, and then finally cooled to a temperature of below about 120° F. by providing in the reheated mixture the solid carbon dioxide as described above.

The composition of the invention can be employed in lubricants in Metalworking operations, especially soluble cutting oils. Soluble cutting oils are well-known commercial products generally comprising a refined lubricating oil base, a soap or other emulsifying agent and a common solvent and/or coupling agent, the materials being present in amounts such that a stable emulsion can be formed by the composition and about 1 to 50 parts of water. Typical soluble oils comprise a lubricating oil base, about 10 to 25 weight percent of an emulsifier such as a sulfonate, naphthenate or oleate, about 3 to 7 weight percent of a secondary emulsifier such as sodium rosinate or analogous metal salt, and about 0.5 to 1 weight percent of an oxygen containing, hydrocarbon coupling agent such as ethyl or butyl Cellosolve (glycol ethyl ether or glycol butyl ether) or diethylene glycol. Additives such as bactericides and extreme pressure agents and the like also are frequently included to advantage.

For the best service it has been found that compounding of the soluble oil and the gel should be accomplished under certain conditions. For example, it has been found that the prepared additive should not be incorporated in the soluble oil when the temperature of the soluble oil is greater than about 150° F. Thus, the additive can be dispersed in the soluble oil at a temperature of about 100° F. while mildly agitating, and temperatures of about 70° F. to 125° F. have been found to be particularly satisfactory. The most advantageous temperature to be employed is determined primarily by the quantity of additive used. For example, with about 3 percent additive a temperature of about 100° F. is most desirable while with 5 percent, temperatures of about 120° to 125° F. appear to be optimum. The foam inhibited soluble oils can also be produced by dispersing the additive components directly into the soluble oil at temperatures of gel formation as mentioned above rather than performing the additive composition and then adding it as such. In this instance also the use of high temperatures, that is above about 150° F. after the additive has formed, should be avoided. The antifoam additive is employed in soluble oils in an amount effective to inhibit formation of and destroy foam occurring in use. Generally about 0.05 to 20 weight percent of the additive, and particularly 3 to 7 weight percent, is employed, based on the resulting soluble oil-additive composition and depending upon the soluble oil used and the use contemplated.

The polymeric materials employed in the present invention are known articles of commerce. They are polymers of ethylene having molecular weights of about 1,000 to 12,000, preferably about 1,500 to 2,500. The polymers generally are used in amounts of about 1 to 10 weight percent of the gel composition, and preferably about 1 to 4 weight percent. In addition to the usual ethylene polymers, terminal hydroxyl-containing polymers of ethylene conforming to the preceding physical properties also can be used. The preferred polymers are terminal hydroxyl-containing polymers of ethylene having a molecular weight of about 2,000 to 2,200. In general, terminal hydroxyl-containing polymers are prepared by polymerizing ethylene at the usual conditions of temperature and pressure, that is at pressures from about 800 to 3,000 atmospheres and temperatures from about 390° to 750° F., with or without a free radical forming catalyst such as hydrogen peroxide and in the presence of hydroxyl-containing chain stopper such as isopropanol. Commercially available examples of satisfactory hydroxyl-containing polymers are Alcowax No. 6 and No. 7, available from Allied Chemical Company. Conditions for the preparation of these materials are well known as is evidenced by U.S. Pat. Nos. 2,504,400 and 2,683,141. By terminal hydroxyl containing we intend to indicate that a hydroxyl radical is on one of the end five or 10 carbon atoms rather than being centrally located in the molecule. It is believed that the hydroxyl radical generally occurs on one of the end three carbon atoms.

The microcrystalline wax component which can be used in the present invention is an article of commerce produced from petroleum oils. Microcrystalline waxes can be obtained from Pennsylvania or Midcontinent crude oils and are generally characterized by a large percentage of nonnormal paraffins and advantageously melt in the range from about 120° to 200° F. (PMP). Typical properties include a petrolatum melting point (PMP) from about 165° to 175° F., a viscosity at 210° F. of about 65 to 80 Saybolt Universal Seconds and a penetration at 77° F. of about 11 to 14. The wax is usually about 2 to 10 weight percent of the gel composition, preferably about 3 to 8 percent.

The major portion and preferably the substantial balance of the novel gel compositions of this invention comprises a liquid organic medium, for example a suitable oil. Suitable oils are those of lubricating oil viscosity and preferably those having a viscosity at 100° F. ranging from about 50 to 150 S.U.S. Oils which are too light may result in bleeding in the resulting gels and those which are too heavy frequently render the gels difficult to disperse in soluble oils. The oils preferably are mineral base and can be obtained from any known crude. Particularly satisfactory oils include naphthenic base lubricating oil fractions having a viscosity of about 100 S.U.S. at 100° F.

Thus typical compositions include a gel composed, for example, of a liquid organic medium, about 2 to 10 weight percent of the wax and about 1 to 10 weight percent of ethylene polymer. A typical specific composition is a gel containing a naphthenic base lubricating oil fraction having a viscosity of 100 S.U.S. at 100° F., 5 weight percent of a paraffin base microcrystalline wax having a PMP melting point of about 165° F. and 2 weight percent of a polymer of ethylene having a molecular weight of 1,800. In the soluble oil compositions, a typical specific composition is 5 weight percent of the above specific gel dispersed in a soluble oil consisting of a Midcontinent base lubricating oil having a viscosity at 100° F. of 125 S.U.S., 15 weight percent of sodium mahogany sulfonate, 5 weight percent of sodium rosinate and 2 weight percent of diethylene glycol. All percentages are by weight percent based on the resulting compositions, unless otherwise specified. While a gel is the specified and preferred physical state of use, the foam inhibiting composition can be used as a liquid provided it has first been a gel.

In addition to the components of the gel compositions described, and of the soluble oils where employed, the compositions can also contain other additives commonly employed in the art in the usual amounts so long as the foam-depressing and foam-breaking properties are not unduly deleteriously affected. Such additives include antioxidants, wetting agents, extreme pressure agents, antistaining agents and so on.

The carbon dioxide particles are added to the solution in an amount sufficient to cool the solution to a temperature below about 120° F. in a time sufficient to yield a gel having low-particle size and a high degree of particle distribution of the ethylene polymer and wax. The amount of carbon dioxide particles added is generally sufficient to cool the mixture to a temperature below about 120° F. in about 2 hours or less. This amount may vary depending on the temperature of the solution, ambient temperature, etc., but can often be from about 0.1 to 10 weight percent of the mixture, preferably about 0.5 to 5 weight percent. The carbon dioxide particles are of a size sufficient to provide the cooling area to give the desired cooling rate and can often range from about 1 inch to about 1 foot, preferably from about 2 to 8 inches, in the widest transverse dimension. The particles can be of any desired shape and are often irregularly shaped particles produced from commercially available slabs of carbon dioxide.

The invention will be described further in connection with the following examples. It should be understood that the details disclosed are not intended as limiting the invention.

EXAMPLE I

A typical commercial procedure for making the foam inhibitor based on U.S. Pat. No. 2,972,578 can be by adding 800 pounds of a naphthenic lube oil having a viscosity of 100 S.U.S. at 100° F., into a jacketed kettle and heating to 220° F. Thirty pounds of a terminal hydroxyl-containing polymer of ethylene having a molecular weight of 2,100 are added and stirred 15 minutes or until dissolved. The mixture is cooled rapidly by indirect heat exchange to 170° F., and then 75 pounds melted paraffin base microcrystalline wax having an AMP melting point of 128° F. are added. Cooling is continued while adding 595 pounds of the lube oil. After all oil has been added, stirring is stopped except for about 2 minutes out of each hour, and cooling is continued until temperature reaches 90° F.

Commercial experience has shown that during winter months, when cooling water temperature can be as low as about 40° F., and the above cooling can be effected within about 3 to 4 hours, a satisfactory product is produced. As this time is exceeded, due to use of higher temperature cooling water as is common during warm weather months, the product becomes less effective, presumably because of a change in particle size due to the slower cooling.

EXAMPLE II

A typical manufacture using the procedure of U.S. Pat. No. 3,078,237 can be by adding 1,500 pounds of the lube oil of example I into a kettle, together with 100 pounds of the polyethylene of example I. This mixture is heated to 220° F. and mixed until blended. Two hundred fifty pounds of the wax of example I are added at 220° F. and mixed until blended. Three thousand fifty pounds of the lube oil are then added, and the total mixture cooled by indirect heat exchange to 140° F. The mixture is then reheated to 165°–175° F. to give a homogenous solution, and then cooled to 120° F.

Although this modification has enabled the manufacture of a more consistently active foam inhibitor material, problems have also been encountered during prolonged hot weather periods such as to raise cooling water temperatures to about 80° F. or higher. The problem occurs during the cooling of the product mixture from about 165°–175° F., to about 120° F. It is this cooling period that apparently affects the particle size or pattern distribution in the total mix. In general, it has been found that when cooling water temperature exceeds about 80° F., often requiring more than about 6 to 8 hours to cool to 120° F., the mixture has little or no foam inhibitor activity. Best results have been obtained when this cooling period requires about 2 hours or less.

EXAMPLE III

One thousand five hundred pounds of the lube oil of example I and 100 pounds of the polyethylene of example I were heated with mixing to 220° F. until blended. Two hundred and fifty pounds of the microcrystalline wax of example I were then added at 220° F., and mixed until blended with no further heat applied. Three thousand one hundred and fifty pounds of the lube oil were then added and the total mixture cooled to 140° F. by indirect heat exchange with water at above 80° F. The mixture was then reheated to 165° F. in the manner taught by U.S. Pat. No. 3,078,237 to give a homogeneous solution. At this point, the reaction mixture was subjected to shock cooling by adding 80 pounds of fist size pieces of solid carbon dioxide. By this means, cooling to below 120° F. was effected in less than 1 hour.

The 1 hour cooling time from 165° F. to below 120° F. by this improved process compares with a range from about 12 hours down to more than about 2 hours as the least cooling times possible by the processes of the above-mentioned prior art.

EXAMPLE IV

The effectiveness of a soluble oil foam inhibitor can be evaluated by means of the following foam test:

One gram of foam inhibitor is blended with 99 grams of heat soluble oil by stirring at room temperature and this blend is used to make a 1:20 dilution of finished soluble oil in distilled water. A 100 ml. portion of the water diluted blend is shaken vigorously for 30 seconds, and observed for foam level after 5 minutes standing. It has been found that those mixtures which show a maximum foam level of 1 ml. after 5 minutes will give satisfactory nonfoaming performance in field service.

The following foam test data compares the effectiveness of products made by the preceding examples:

| Manufacturing procedure | Typical cooling time, hrs. | | Typical foam test, ml. foam, 5 min. | Anti-foam acceptance |
|---|---|---|---|---|
| | Winter | Summer | | |
| Example: | | | | |
| 1 | 3 | | 0.5 | Pass. |
| 1 | | 12 | >5 | Fail. |
| 2 | 2 | | 0.5 | Pass. |
| 2 | | 6 | 1 | Borderline. |
| 2 | | 10 | >5 | Fail. |
| 3 | | 1 | 0.2 | Pass. |
| 3 | | 1 | 0.0 | Do. |
| 3 | | 1 | 0.1 | Do. |

The above data shows the more rapid cooling that can be obtained with the instant process and the more effective antifoam properties of the resulting manufactured product.

The improved manufacturing process of this invention has an obvious saving in processing time due to the more rapid cooling rate in the final stages. More important however, this improved process provides a foam inhibitor under conditions which up to this time prohibited manufacture and, in addition, provides a material having superior antifoam properties.

It is claimed:

1. A method for producing a gel consisting essentially of a major amount of a mineral oil of lubricating viscosity, about 1 to 10 weight percent of an ethylene polymer having a molecular weight of about 1,000 to 12,000 and about 2 to 10 weight percent of a petroleum microcrystalline wax, which comprises heating the mixture of said oil of lubricating viscosity, ethylene polymer and microcrystalline wax, at a temperature sufficient to provide solution and shock cooling the solution by providing therein particles of solid carbon dioxide in an amount sufficient to cool the mixture to a temperature below about 120° F. in a time of about 3 hours or less sufficient to yield a gel having low-particle size and a high degree of particle distribution of the ethylene polymer and wax.

2. The method of claim 1 wherein the carbon dioxide is added in an amount sufficient to cool the mixture to a temperature of below about 120° F. in about 2 hours or less.

3. The method of claim 1 wherein the solution is cooled below the cloud point of the mixture and reheated to a temperature within the range of immediately above the cloud point of the mixture to about 20° F. above the cloud point prior to shock cooling.

4. The method of claim 3 wherein the carbon dioxide is added in an amount sufficient to cool the mixture to a temperature of below about 120° F. in 2 hours or less.

5. The method of claim 4 wherein the carbon dioxide is added in an amount of from about 0.1 to 10 weight percent of the solution.

6. The method of claim 5 wherein the carbon dioxide is added in an amount of from about 0.5 to 5 weight percent of the solution.

7. The method of claim 1 wherein the ambient temperature is at least 80° F.

* * * * *